R. HERMAN.
TRANSMISSION MECHANISM.
APPLICATION FILED APR. 25, 1911.
1,173,964.
Patented Feb. 29, 1916.
2 SHEETS—SHEET 1.
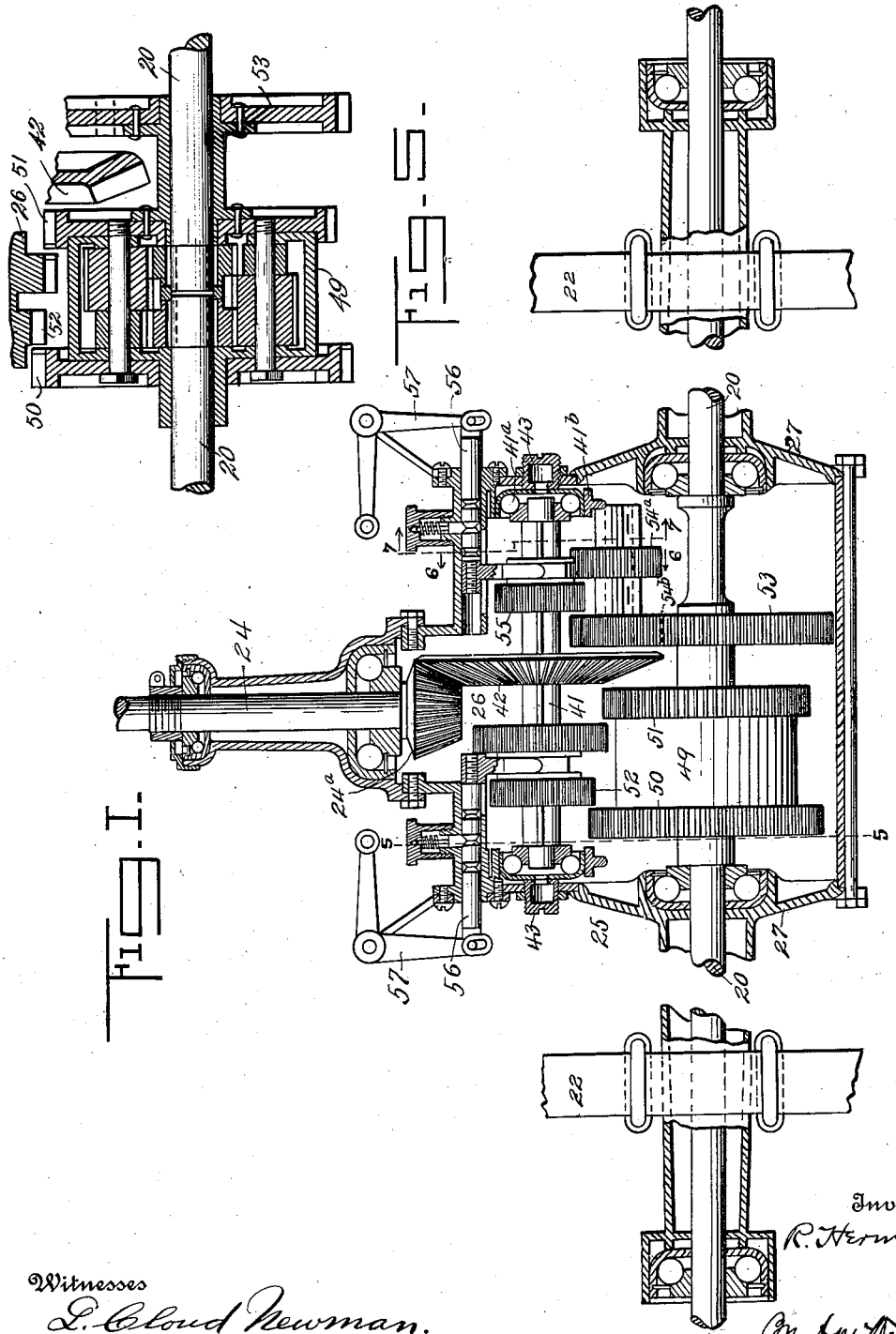

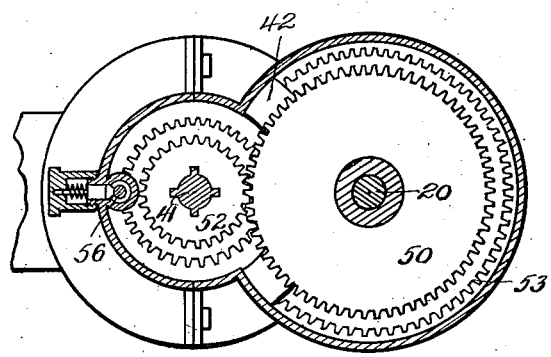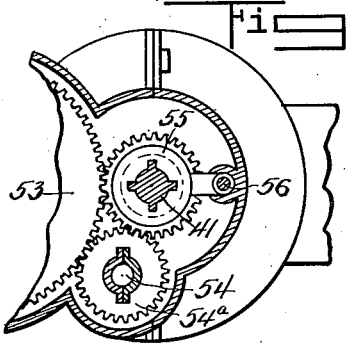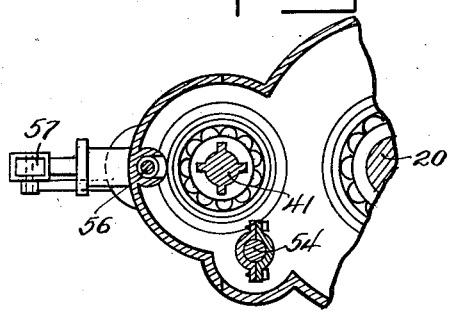

UNITED STATES PATENT OFFICE.

REINHOLD HERMAN, OF CRAFTON, PENNSYLVANIA.

TRANSMISSION MECHANISM.

1,173,964.           Specification of Letters Patent.     Patented Feb. 29, 1916.

Original application filed January 9, 1911, Serial No. 601,754. Divided and this application filed April 25, 1911. Serial No. 623,288.

*To all whom it may concern:*

Be it known that I, REINHOLD HERMAN, a citizen of the United States, residing at Crafton, in the county of Allegheny and State of Pennsylvania, have invented certain new and useful Improvements in Transmission Mechanism, of which the following is a specification.

My invention relates to improvements in transmission mechanism, and has particular relation to a change-speed gearing structure.

The present invention is designed mainly for use in connection with automobile or motor vehicle structures, the driven shaft acting the part of the axle of such vehicle, but it is to be understood that I do not limit myself to this particular use, since the structure and arrangement of parts is such as will permit its use in other connections; for instance, where used in connection with motor vehicles, the driven shaft would have the direction of length of its shaft line at approximate right angles to the direction of length of the drive shaft line, whereas a change in gear structure will permit of an arrangement of the parts so as to provide for the operative connection of shafts having their shaft lines extending in the same general direction, either in coincidence, in parallelism, or angular with respect to each other. As the structure, however, is intended for use in connection with motor vehicles, I have herein described it in connection with such vehicles, this forming the best exemplification now known to me of its use.

In motor vehicle structures, the axle, which forms the driven shaft is generally connected to the motor by means of universal joints, a transmission mechanism and a propeller shaft which extends from the axle and is coupled by means of a universal joint to the divided shaft of the transmission mechanism, the latter being bolted to the frame of the vehicle; the other portion of the divided shaft is coupled to the clutch of the fly wheel of the motor by means of another unversal joint. It will be noted that in order to make use of the different reductions of gears for the purpose of obtaining the proper compounding of power, there is necessitated the use of a number of journals and disconnected elements which introduce an enormous amount of friction or loss of power, in addition to which the up-keep of all these parts provides a source of considerable expense to the user; such construction also has the effect of creating a great deal of noise in use forming an annoyance not only to the occupants of the vehicle but also to the general public.

In the present invention, I provide supporting means for the transmission mechanism so arranged as to eliminate the use of divided shafts, or coupling parts and journals which support the frame, and all other adjuncts thereto required in its operation; I also elminate the employment of a structure in which the counter-shaft remains an idle element when the drive and driven shafts are operatively connected. Furthermore, I provide a structure in which the gearing and other operative elements of the transmission mechanism are at all times positioned to permit operation through the normal service operations, and at the same time permit parallel, alined or angular adjustments of the drive and driven shafts relative to each other as may be required to meet various conditions or uses, there being no necessity for changing, either by the addition or elimination of any part of the same to provide these adjustments, the construction being such that the driven shaft and its housing are at all time retained in their original position.

The present application is a division of my application for supporting means for transmission mechanism, filed January 9, 1911, Serial No. 601,754, wherein is disclosed in greater detail, the specific construction and arrangement of parts of the casing within which the change speed gearing is mounted, the casing being so formed as to permit of various adjustments without affecting normal gear connections, the structure of which forms the subject matter of the present application.

The invention of this application has for its principal objects the following: (1) The provision of transmission mechanism in which the drive and driven shafts are operatively connected only through an intermediate shaft, the latter being in permanent drive connection with the drive shaft. (2) The provision of transmission mechanism having the drive and driven shafts operatively connected only through an intermediate shaft, the latter being in permanent drive connection with the drive shaft and carrying gears movable axially for the purpose of engaging and disengaging with complemental gears of the driven shaft, the structure being such that the driven shaft is free from gear engagement at all times excepting when being positively driven from the drive shaft, thereby permitting the driven shaft or axle to run free and substantially noiseless. (3) To provide a transmission mechanism in which the drive and driven shafts are operatively connected only by an intermediate gear, the latter being in permanent drive connection with the drive shaft through a bevel gear connection and providing the support for the intermediate shaft with means for adjusting the shaft lengthwise to take up wear in said bevel gear connection.

Other objects of the invention are to provide a structure of this character which is compact, durable in construction, requires a minimum of repairs, is readily assembled, which can be manufactured at a relatively low cost, and which can be applied universally to all types of motor vehicles.

To these and other ends, the nature of which will be readily understood as the invention is hereinafter disclosed, my invention consists of the improved construction and combination of parts, hereinafter described, illustrated in the accompanying drawings, and particularly pointed out in the appended claim.

In the accompanying drawings, in which similar reference characters indicate similar parts in each of the views, Figure 1 is a view showing my improved gearing structure in position in a casing of the type disclosed in my companion application above identified, and of which this is a divisional application, the casing being shown in section, and the gear structure mainly in elevation. Fig. 2 is a sectional view taken on line 5—5 of Fig. 1. Fig. 3 is a similar view taken on line 6—6 of Fig. 1, looking toward the left. Fig. 4 is a sectional view on the frame line of said Fig. 1, but looking toward the right. Fig. 5 is a detail sectional view illustrating one form of transmission mechanism which may be employed in connection with the divided axle.

In the drawings, 20 indicates the axle or driven shaft of a motor vehicle, 22 the springs supporting the chassis, 24 the drive shaft, 25 the supporting means for the transmission mechanism, and 26 the transmitting connections beween the drive and driven shafts. The driven shaft or axle is preferably divided, as shown in Fig. 5, the specific construction of the differential housing mounted thereon and which carries the gears 50 and 51, not being specifically described herein, as the same forms a part of the subject matter of an application filed by me concurrently with the parent application of which it is a division, said concurrent application being filed January 9, 1911, Serial #601,758.

The supporting means 25 is mounted on the axle and in turn supports the springs 22 on which are mounted the chassis, this construction providing the direct support of the chassis on the transmission supporting means instead of directly on the axle, thereby permitting of the use of anti-friction devices between the parts supported by the axle and the axle itself and eliminating the effect of the chassis weight to a considerable degree by reason of the fact that the weight is applied at diversified points instead of at a single point at each side of the axle. Furthermore, this arrangement permits of the employment of the supporting means for the chassis as a lubricant container, enabling a distribution of the lubricant throughout substantially the length of the axle and providing additional space for the lubricant, augmenting the supply carried within the main portion of the supporting means for the transmission mechanism.

As heretofore stated, the supporting means 25 is more particularly described and claimed in the application of which this is a division, forming no part of the invention forming the subject matter of the present application. For the purpose however, of locating certain of the parts of the specific gear construction, it will be noted that the casing is formed of three members, one of which is carried by the axle and forms the main support for the casing; the second is adjustable pivotally on the first with the axle as the axis, while the third member which carries the drive shaft is also adjustable pivotally with the intermediate shaft as the axis, the parts so arranged in connection with the specific structure of elements of the present invention, providing a transmission mechanism capable of adjustment in the angular relationship of the drive and driven shafts without affecting the relative positions and movements of the specific elements of the change speed gearing.

Referring now more particularly to the invention of this application, the drive shaft is indicated as 24, the driven shaft or axle as 20 and the intermediate shaft as 41, the latter shaft being mounted in anti-friction bearings 41$^a$ held by straps 41$^d$ secured to one of the sections of the second member by suitable bolts. Said shaft 41 is also provided with a bevel gear 42, said gear being permanently positioned on said shaft and having a drive engagement with a complemental bevel gear 24$^a$ carried by the drive shaft, this construction providing a permanent drive connection between the drive shaft 24 and the intermediate shaft 41.

If desired, and such construction is preferred, I may provide for adjustment of the shaft 41 longitudinally to take up wear of the bevel gears by employing a suitable cap 43 adapted for screw threaded engagement with the second member of the supporting means, said caps abutting against a race-way provided for the anti-friction bearings of said shaft 41 and permitting adjustment of the bearings relative to the member axially of the shaft, this adjustment providing movements of the shaft 41 longitudinally and thus taking up for wear of the bevel gears as well as to provide for the original adjustment of the gears when the parts are assembled.

The gear connections between the intermediate shaft and the driven shaft or axle are preferably as follows: Mounted on the driven shaft is a differential mechanism 49, said mechanism having gears 50 and 51 of different diameters, and spaced apart a distance sufficient to permit of the movement of the selecting gear 52 mounted on the shaft 41, these parts being located on one side of the gear 42. On the opposite side of said gear 42 I show the slow-speed gear 53 mounted on the carrier for the differential mechanism, a suitable reversing gear structure embodying gears 54ª and 54ᵇ being mounted on a stub-shaft 54 carried in bearings formed in the second member of the casing, the shaft 41 carrying a selecting gear 55, the arrangement being such that movements of the selecting gears 52 and 55 longitudinally of the shaft 41 will provide a selective drive engagement or connection between shafts 41 and 20. For the purpose of providing such selecting movements of the gears 52 and 55, I preferably form the shaft 41 with one or more longitudinally extending ribs 41ª, the gears 52 and 55 having suitable ways for the passage therethrough of the ribs, this particular construction causing the gears 52 and 55 to be positively driven with the intermediate shaft 41, and at the same time be permitted to move longitudinally of the shaft when it is desired to provide the operative connection between the drive and driven shafts.

Inasmuch as the gears which are connected to the gears 50 and 51 are of different diameters, I preferably form the gear 52 in the manner indicated in the drawings, this construction permitting a single lever to act to move the gear into engagement with either gear 50 or 51 as desired. The gear 55, however, is preferably a single gear, the gears with which it is adapted to coöperate (53 and 54ª) being capable of arrangement in such manner that the axial movement of the single gear will cause its teeth to intersect the path of movement of the teeth of the two sets of gears with which it is adapted to coöperate. To provide the shifting movements for the gears 52 and 55, I show a structure embodying a bar 56 adapted to move in a direction parallel to the axis of the shaft 41, said bar having a laterally-extending member engaging the selecting gear, said bar being movable through the movements of an angle lever 57 operatively connected to a controlling device (not shown), the bar preferably being provided with notches or recesses to receive a spring-pressed plunger for the purpose of retaining the bar against a free longitudinal movement, this construction being of a well known type. It is to be understood that a seperate operating device is preferably employed with each the gears 52 and 55. It is to be understood, of course, that the axle or driven shaft is in the form of a divided structure, the differential mechanism 49 coöperating with the parts of the shaft to permit the relative movements of the vehicle wheels in use.

By providing a neutral position for the selecting gears, in which position the driven shaft gears are entirely disconnected from any of the drive portions of the mechanism, the friction provided by the use of contacting gears, as in the general type of transmission mechanisms, is eliminated, the axle running free except when a selecting gear has operatively connected the drive and driven shaft. And since the only connection between the constantly driven shaft 41 with its bevel gear and the driven shaft is through the selecting gears 52 or 55, it will be clear that when said gears are in neutral position not only will the driven shaft be entirely disconnected from the drive connections and therefore free to move (as when drifting), but in addition, the friction which would be placed on the bevel gears by a contact of the driven shaft gears with the gears carried by the constantly driven shaft is eliminated, so that the wear and tear of the constantly driven connections and their bearings is reduced to a minimum. By this construction, it will be obvious that the ability to entirely disconnect the constantly-driven (intermediate) shaft and the driven shaft in such manner that the gears carried by these respective shafts are out of contact with one another provide a freedom of operation sufficient to increase the running qualities of the vehicle. This is especially true when the vehicle is "drifting," the freedom from friction permitting the vehicle to run free.

There is a particular advantage in the particular arrangement of the connections between the drive shaft and the differential mechanism, particularly during the change speed operation, or when "picking-up" from the "drifting" position. As will be seen, the drive-shaft and intermediate shaft are connected by bevel gearing which provides a reduction in speed from the drive to the intermediate shafts in definite ratio. As a result, the selecting gears are traveling at a speed more closely approximating the speed of the driven shaft gears when the clutching action takes place, thus enabling the gears to be engaged with decreased liability of stripping the gear teeth.

As heretofore stated and as herein disclosed, the structure is particularly designed for use with motor vehicles, but as will be readily understood, the general principles involved in the structure are such as will enable it to be employed in other connections where it is desired to provide a transmission of power of one shaft to another; and while the disclosure is such as to provide for the transmission of power between shafts having their shaft lines at right angles, through the bevel gear connections shown, the idea may be employed in connection with shafts which are not angular in this respect by a change in the form of gear connections and such modifications as may be necessary to provide for the entrance of the driven shaft for the supporting means, such variations in the general ideas disclosed herein and the use are contemplated by the present invention, and I therefore desire it to be understood that I reserve the right to make any and all such changes and modifications therein as conditions may require, so far as they fall within the spirit and scope of the invention as expressed in the appended claim.

What I claim is:—

A drive shaft, a driven element, spaced gears of different diameters fixed to the driven element, an intermediate shaft constituting a counter shaft fixedly spaced from the driven element, gearing connecting the counter and drive shafts, a pair of gears splined on the counter shaft and connected for simultaneous movement therealong, said pair of gears lying beween the gears on the driven element when in central position and movable into engagement selectively with said gears, a third gear fixed on the driven element, a stub shaft between the driven element and counter shaft, a gear on said stub shaft meshing with the third gear on the driven element, a second gear fixed on the stub shaft, a third gear splined on the counter shaft and movable into selective engagement with the third gear on the driven element and the second gear on the stub shaft, and means to move the last mentioned gear along the counter shaft.

In testimony whereof I affix my signature in presence of two witnesses.

REINHOLD HERMAN.

Witnesses:
J. T. MONTGOMERY,
ERNEST PAYNE.